United States Patent [19]

Farner

[11] 4,010,920

[45] Mar. 8, 1977

[54] APPARATUS AND METHOD TO CONTROL FORWARD CONTROL SURFACE TYPE AIRCRAFT IN FLIGHT

[76] Inventor: Hans U. Farner, Mythenstrasse 9, Hinwil, Switzerland

[22] Filed: Nov. 19, 1974

[21] Appl. No.: 525,120

Related U.S. Application Data

[63] Continuation of Ser. No. 289,281, Sept. 15, 1972, abandoned.

[30] Foreign Application Priority Data

Sept. 17, 1971 Switzerland ............... 13630/71

[52] U.S. Cl. .................. 244/89; 244/45 A
[51] Int. Cl.² .................. B64C 5/10
[58] Field of Search ........ 244/40 R, 41, 42 D, 244/45 R, 45 A, 83 R, 89, 135 A

[56] References Cited
UNITED STATES PATENTS

| | | | |
|---|---|---|---|
| 2,271,226 | 1/1942 | Johnson | 244/45 A |
| 2,430,793 | 11/1947 | Wells | 244/45 R |

FOREIGN PATENTS OR APPLICATIONS

| | | | |
|---|---|---|---|
| 850,410 | 12/1939 | France | 244/45 A |
| 874,432 | 8/1942 | France | 244/40 R |
| 421,649 | 5/1947 | Italy | 244/45 R |
| 15,924 | 7/1909 | United Kingdom | 244/45 A |
| 477,395 | 12/1937 | United Kingdom | 244/45 A |
| 770,923 | 3/1957 | United Kingdom | 244/45 A |

*Primary Examiner*—Trygve M. Blix
*Assistant Examiner*—Edward R. Kazenske
*Attorney, Agent, or Firm*—Flynn & Frishauf

[57] ABSTRACT

The control surface-type wing, forward of the center of gravity of the aircraft is placed to be shiftable longitudinally with respect to the center of gravity of the aircraft and also adjustable with respect to a transverse and longitudinal axis of the aircraft to thereby provide for sensitive control of the aircraft flight.

20 Claims, 15 Drawing Figures

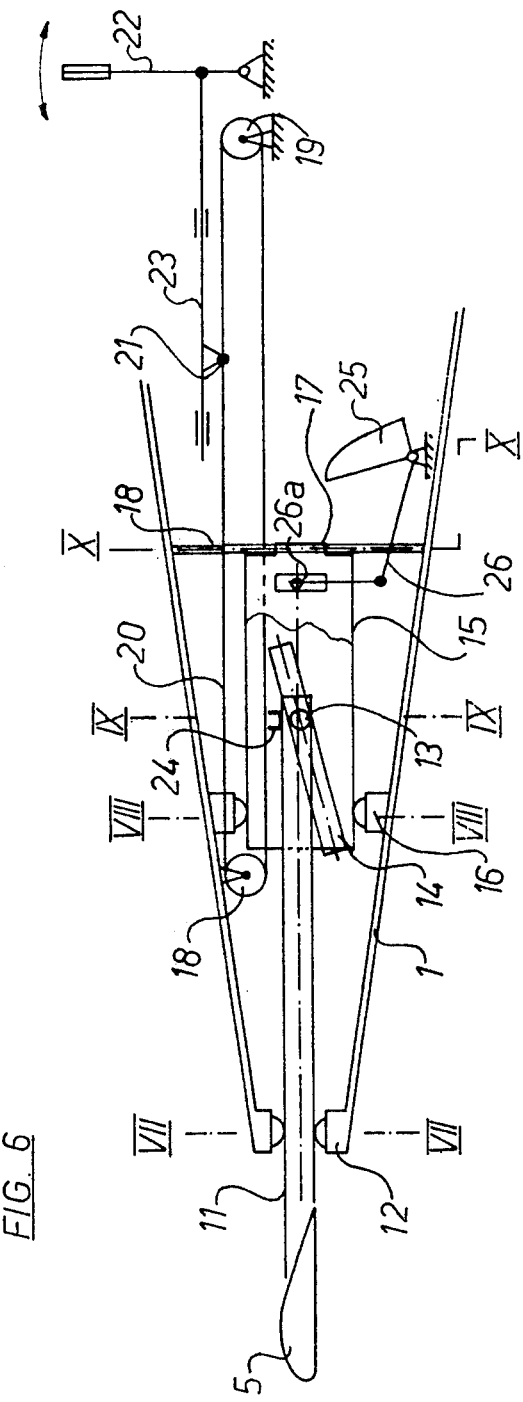
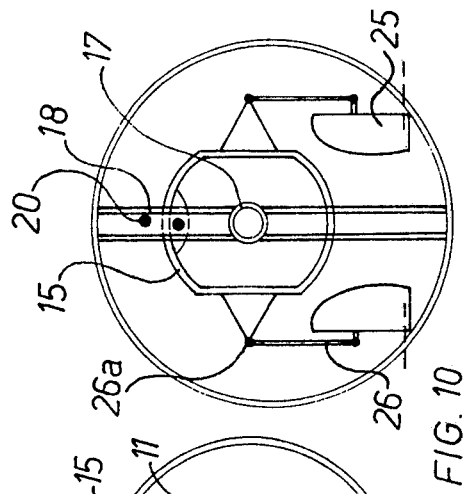
FIG. 10
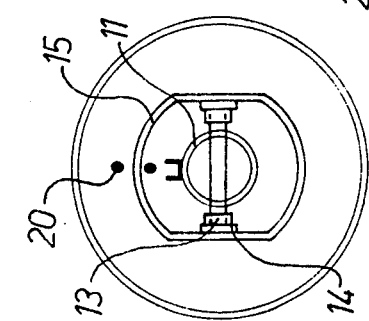
FIG. 9
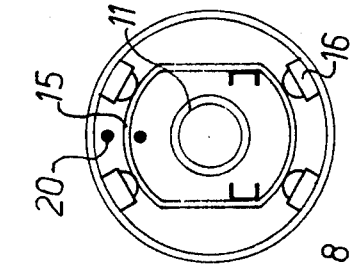
FIG. 8
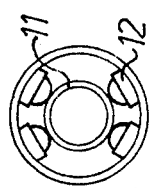
FIG. 7

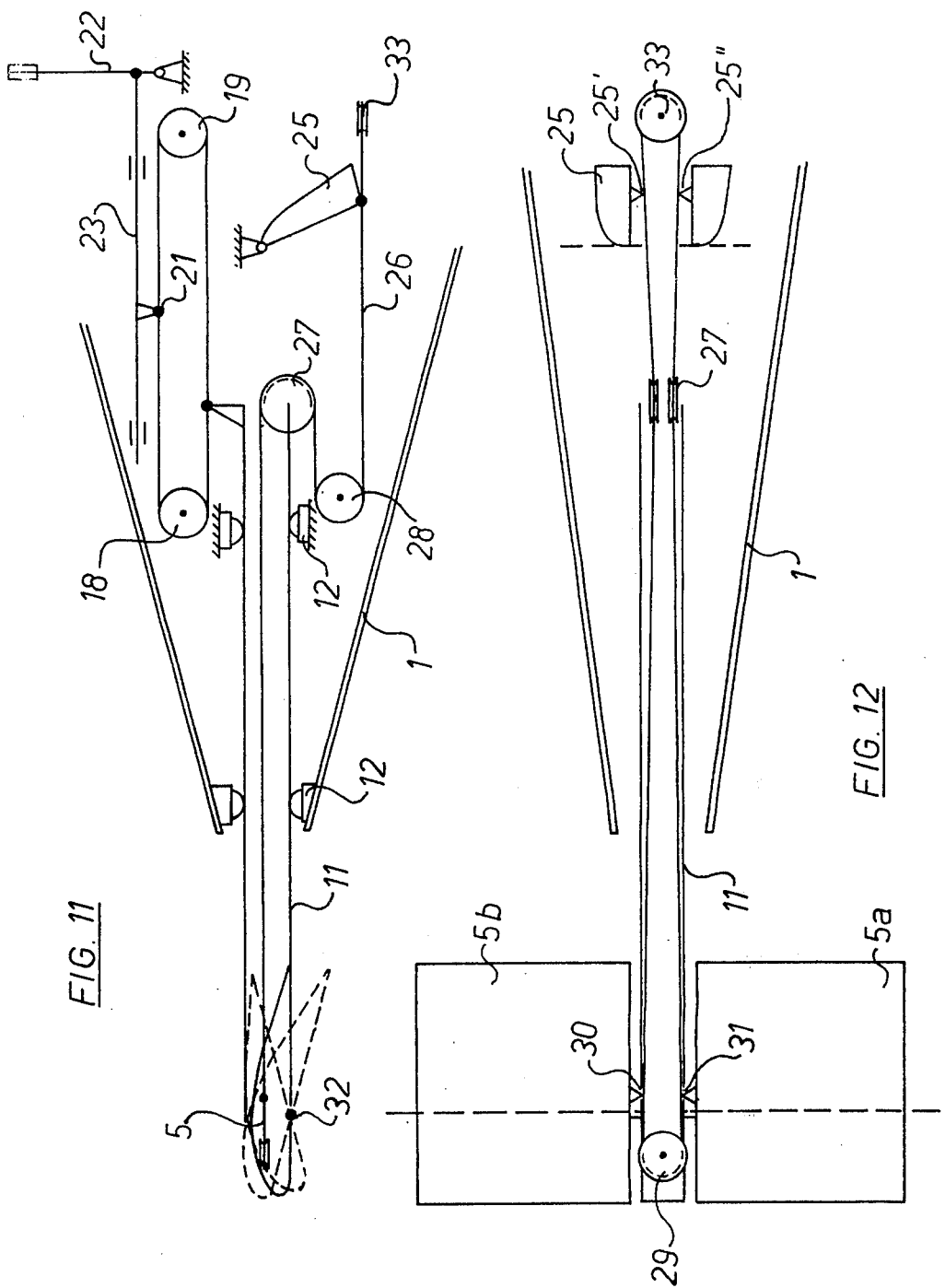

APPARATUS AND METHOD TO CONTROL FORWARD CONTROL SURFACE TYPE AIRCRAFT IN FLIGHT

This is a continuation of application serial number 289,281, filed Sept. 15. 1972 now abandoned.

The present invention relates to a method and to apparatus to control control surface-forward type of aircraft, also referred to as duck type, or canard type, or tail-first mechines; or aircraft of the tandem type, and in which a control surface-type lifting air foil is located in advance of the main wing, and forward of the center of gravity of the aircraft.

Aircraft are usually controlled by providing an auxiliary airfoil surface, in the form of a stabilizer, and a elevator or rudder on it. The airfoil surfaces can be changed or shifted into position, thus providing for change in the attitude of the aircraft in flight. These auxiliary surfaces generate no, or hardly any, lift when the aircraft operates normally, and thus enough variation in air flow effect is obtainable in order to control the aircraft by changing the lift effect of the auxiliary control surfaces. These surfaces are so designed that they cause practically no induced drag since, as is known, the auxiliary surfaces can be made with small span and comparatively great depth-(chord).

Aircraft which have essentially only supporting or lifting wing surfaces but actually hardly any control or guiding surfaces cause difficulties if the aircraft is to be controlled by means of rudders and/or flaps secured to the support wings, since control of the aircraft cannot be effectively accomplished. Upon change of the flaps, or ailerons, on the lifting surfaces, a change in the lift of the wings will arise, which, however, may be small with respect to the lift provided by the wings under normal flight conditions and which is additionally limited by the maximum lift available from the design profile of the aircraft. Thus, increasing or decreasing the lift of the wing surface, which are the results to be obtained from aircraft control, is limited within narrow confines.

It is an object of the present invention to provide an apparatus and a method to control aircraft in flight which does not have the aforementioned limitations.

SUBJECT MATTER OF THE PRESENT INVENTION

Briefly, and in accordance with the method, the vector of the resulting force of air flow, or lift due to the forward control surface air foil or wing, is changed by rotation and longitudinal shift (but at least shift) of the vector with respect to the center of gravity of the aircraft. Rotation may be about the longitudinal axis of the aircraft and shift along this axis, or (and, additionally, if desired) rotation may be with respect to an axis transverse to the longitudinal axis of the aircraft. As a result of such change of the vector, the magnitude of air forces themselves which act do not change, essentially, but the position at which the forces will act and their direction changes with respect to the center of gravity and thus a highly effective and sensitive control can be obtained. In effect, the length of the moment arm of the pitching moment due to the forward control surface air foil is changed.

In accordance with the feature of the invention, a lifting control surface airfoil wing is provided, located ahead of the main or first wing and connected to the aircraft by means of a shaft which is so arranged that the control surface wing can be shifted longitudinally with respect to the aircraft center of gravity, and, if desired, rotated about the longitudinal axis of the aircraft, or about an axis transverse with respect thereto.

Two illustrated embodiments of the invention are further described with reference to the accompanying drawing, in which:

FIG. 6 is a highly schematic longitudinal cross-sectional view illustrating a control arrangement of a control surface wing having two freedoms of movement;

FIGS. 7, 8, 9 and 10 are cross-sectional schematic views taken along Sections VII, VIII, IX and X of FIG. 6;

FIG. 11 is a schematic side view of control of an aircraft in which the lifting control surface wing is subdivided into a pair of separately rotatable surfaces;

FIG. 12 is a top view of the arrangement of FIG. 11;

Figure 1:
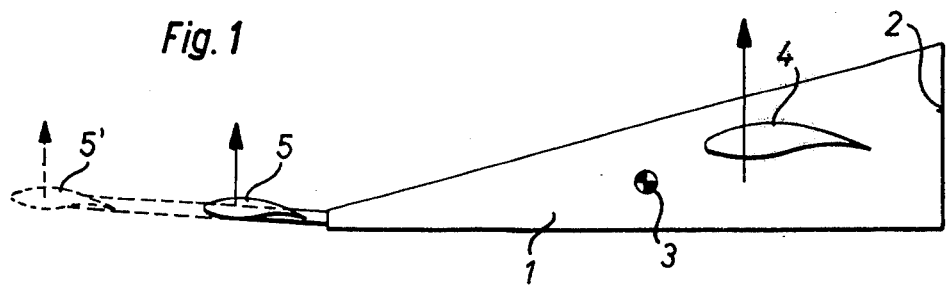
FIG. 1 is a highly schematic side view of an aircraft of the forward control surface type wing in which the distance of the control surface wing is changeable with respect to aircraft center of gravity.

The duck-type, or canard-type, high wing, rear wing aircraft is schematically illustrated in FIGS. 1–5. The fuselage is schematically shown at 1, which terminates at its rear end 2, for example, in a knife edge. The approximate center of gravity is shown at 3; the direction of flight is to the left in FIG. 1. The main or first wing 4 is located aft, or behind the center of gravity 3. The second or lifting control wing 5 which is typically much smaller than the main wing 4, is located in advance of the center of gravity, This second airfoil 5 can be shifted, as seen in FIG. 1, from the solid line position to the dashed line position indicated at 5'. When shifted to position 5', the distance of airfoil 5 from the center of gravity 3 will have changed, in an increasing direction. In this position, there is no change in the angle of incidence of the airfoil 5. Although there is no such change, changing the distance of airfoil 5 from the center of gravity provides for very fine control of the aircraft. The main lift vector of the main wing 4 and lift vector of airfoil 5 (and 5', respectively) are also shown in FIG. 1.

Figure 2:
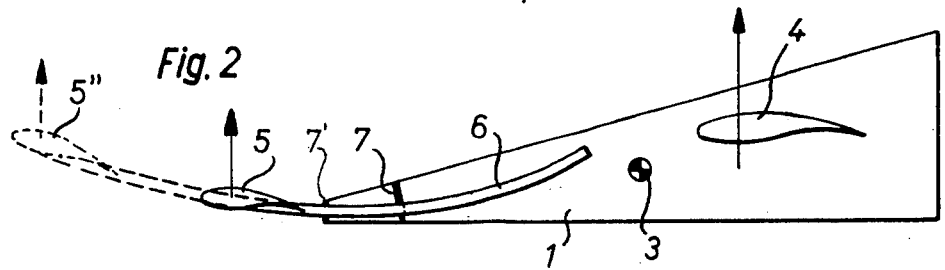
FIG. 2 is a view similar to FIG. 1, in which the control surface wing is shiftable longitudinally and additionally moveable about an axis transverse to the aircraft's main axis.

FIG. 2 illustrates an embodiment in which the distance of airfoil 5 can be shifted with respect to the center of gravity 3 and additionally provides for a change of the angle of incidence. The forward airfoil 5 is secured to a bowed, or curved, shaft 6 which is held in suitable bearing 7, 7' (which will be discussed below). Shaft 6, due to its bend, provides a change in the angle of incidence of airfoil 5 at every specific distance of the airfoil from the center of gravity. As can be seen in FIG. 2, the angle of incidence of the airfoil 5 can be less in retracted position than when the airfoil is extended to the position of 5″. The embodiment of FIG. 2 thus provides for shift of the forward airfoil 5 in two directions: one longitudinal shift approximately along the longitudinal axis of the aircraft and rotation about an axis transverse to the longitudinal axis of the aircraft.

Figure 3A:
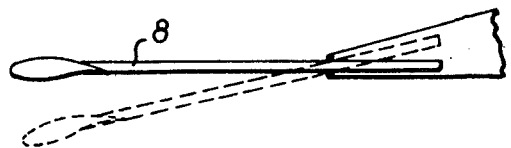
FIG. 3a illustrates another embodiment of a shiftable lifting control surface wing in extended position.
Figure 3B:
FIG. 3b illustrates the control surface of FIG. 3a in retracted position.

FIG. 3a and 3b illustrate an embodiment, schematically, in which again the forward airfoil 5 can have two freedoms of movement. The angle of incidence of the airfoil 5 does not, however, have a fixed relation with respect to the center of gravity 3. Airfoil 5, as schematically shown, is secured to a straight shaft 8 which is journalled in a suitable joint for longitudinal shifting as well as for inclination or tilt. Thus, FIG. 3a illustrates a horizontally extended airfoil in solid line position and in dashed lines, in downwardly tilted position; FIG. 3b illustrates horizontal position of the airfoil, when retracted, and tilt about a transverse axis in dashed lines.

Figure 4:
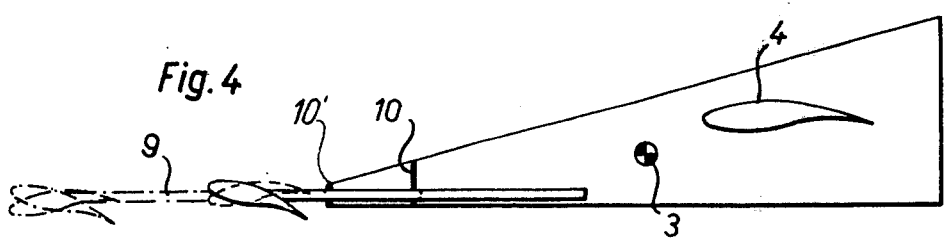
FIG. 4 is a schematic view of an aircraft with another type of control surface wing.

The forward airfoil 5 may, as shown in FIG. 4, be mounted for rocking or tipping movement about a transverse shaft, while also being mounted for longitudinal projection on a shaft 9. Shaft 9 is guided in bearings 10, 10′ for longitudinal movement. Forward airfoil 5 thus again has two freedoms of movement, without a specific allocation of the angle of incidence of the airfoil 5 with respect to its distance from the center of gravity.

Figure 5:
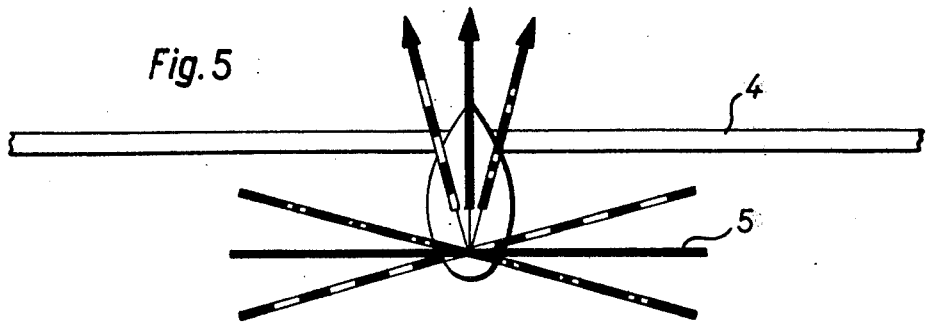
FIG. 5 is a front view of a high wing aircraft of FIG. 1 in which the control surfaces of the above are swingable about longitudinal axes of the aircraft, and illustrating the resulting lift vectors.

The front view of FIG. 5 illustrates an airfoil 5 which is mounted for deflecting movement by swinging about the longitudinal axis of the aircraft. The solid line portion shows airfoil 5 in horizontal position, that is, parallel to the main wing 4; the airfoil shown in broken representation illustrates swinging movement. The lift vectors are likewise shown, with solid line and respectively equally in broken representation.

Various other freedoms of movement of the airfoil 5 can be combined with the ones shown in FIGS. 1-5. The airfoil may have three freedoms of movement, namely, one, a shifting movement longitudinally of the aircraft axis rotation about an axis transverse to the aircraft and rotation about an axis longitudinal with respect to the aircraft. The control system, and this method of control is particularly suitable for canard-type aircraft and tandem aircraft. These types have not been extensively utilized due to difficulties previously experienced with control of such aircraft. Such control, as described, is equally effective as that in presently available on other types of aircraft.

Referring now to FIGS. 6-10, wherein the control system is schematically illustrated: Airfoil 5 is secured to a shaft 11. Shaft 11 is longitudinally slideable, and guided in ball raceways 12 (see FIG. 7) at the forward end of the aircraft. Spaced from raceways 12 are rollers 13 (see FIG. 9) which secure shaft 11, the rollers 13 being rotatable and capable of running, in turn, in the pair of oppositely facing U-channels 14 which are inclined with respect to the shaft 11. U-channels 14 are located in the interior of a tubular body 15. Tube 15 itself is journalled in a ball-supported race 16 (see FIG. 8) on one end and in a pin-bearing 17 at the other (see FIG. 10), to be rotatable but not longitudinally slideable. The pin-bearing 17 is supported on the fuselage 1 by support struts 18. A cable, a chain or other flexible element 20 is guided over a pair of rollers 18–19. Cable 20 is connected by means of a link 21 to a push rod 23 connected to the control stick 22 of the aircraft. Cable 20 is connected to shaft 11 by means of a link 24; one of the cable sections is threaded through tube 15. The degree of inclination of the U-channels 14 with respect to shaft 11 is, in actual practice, much less than shown in the drawing, which is highly exaggerated for clarity. Pedals 25 are connected by means of link 26 and joint 26a with tube 15 and rotate tube 15 about its axis (due to the bearings 16, 17) and with it shaft 11 carrying airfoil 5.

Operation: when moving control stick 22, the airfoil 5 is shifted longitudinally. Movement of pedals 25 rotates tube 15 and hence shaft 11 to tilt the airfoil. Upon longitudinal movement, the change in the angle of incidence of the airfoil will be obtained simultaneously due to the inclination of the U-channels 14 with respect to shaft 11 as determined by the inclination of the U-channels 14.

Figures 13, 14:
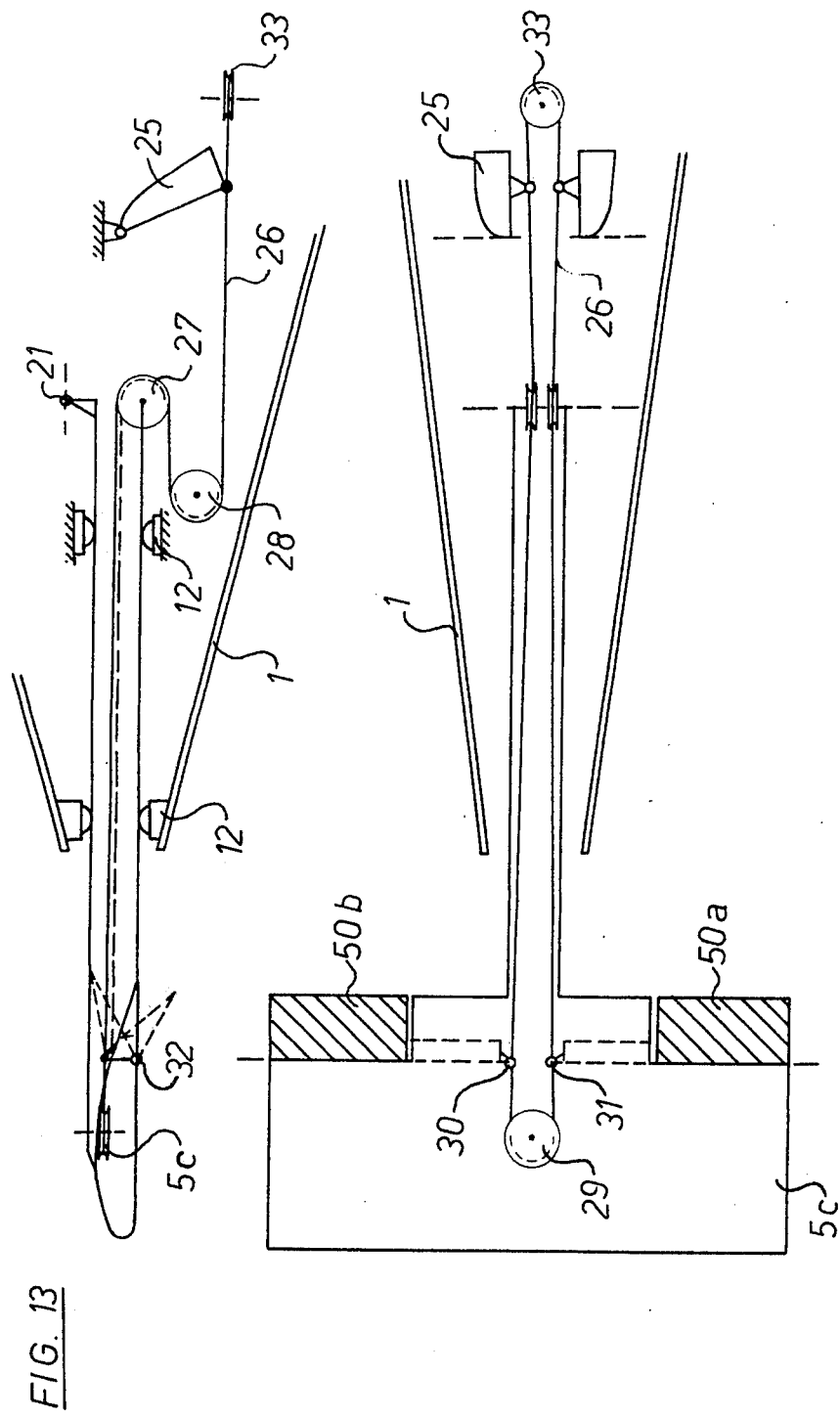
FIG. 13 is a schematic side view of another embodiment of the invention in which the lifting control wing has movable aileron flaps.
FIG. 14 is a schematic top view of the arrangement of FIG. 13.

The forces necessary to move the airfoil 5 may be high as the size of the aircraft increases. In order to move the airfoil, therefore, forces arising from air flow itself can be utilized. Referring to FIGS. 11 and 12, the airfoil 5 is subdivided into two portions 5a and 5b which are capable of being rotated independently in opposite directions; or the airfoil may be provided with ailerons, see FIGS. 13, 14, in which an airfoil 5c has trailing ailerons 50a, 50b.

FIGS. 11 and 12 illustrate a pedals 25 connected over linkages 25′, 25″ and flexible motion and force transmission element, such as a cable 26 guided over a roller 33 and compensating rollers 27, 28 to control the airfoil portions 5a, 5b. Compensating roller 27, 28 and roller 29 provide for length-compensation upon movement of shaft 11. Joints 30, 31 provide for swinging movement of the airfoil portions in the manner of wing flaps or lateral control flaps about an axis 32. All other elements which have been given the same reference numerals as those before-mentioned are identical to the previously-described components.

Lateral control flaps or wing flaps 50a, 50b (FIGS. 13, 14) can be operated similarly by means of pedals 25, as illustrated. The force vectors arising from deflection of the flaps will, effectively, cause rotational forces about an axis parallel to the axis of the aircraft.

The described embodiment is highly schematic; instead of control by means of cables and links, Bowden cables, hydraulic or electrical controls, servo and other power assists and power booster controls can be used. The present invention is specifically directed to the principle of control, and of shifting of second lifting airfoil, ahead of the main wing (in the direction of flight). The specific control of such an airfoil is known and can be carried out by standard means. Control is simple since the control stick 22 operates only elevation, or attitude, and does not affect lateral deviation or turning of the aircraft, unless differential deflection of separately-controlled flaps (FIGS. 11–14) is utilized.

Various changes and modifications may be made within the scope of the inventive concept.

I claim:

1. Method to control a heavier-than-air, forward-control wing aircraft, having a first wing (4) to provide part of the lift,
a forward lifting-and-control wing (5), and
support means (6,8,9,11) supporting said forward lifting and control wing (5) on the aircraft,
said method comprising the steps of generating a first lift force vector aft of the center of gravity of the aircraft to provide part of the lift by locating the first wing (4) behind the center of gravity (3)

generating a second lift force vector forwardly of the center of gravity (3) of the aircraft to provide the remaining part of the lift by locating the forward lifting and control wing (5) forwardly of the center of gravity (3);

and shifting the second lift force vector derived from the forward lifting-and-control wing (5) in the direction of the longitudinal axis of the aircraft and with respect to the center of gravity thereof, said second lift force vector being shifted by moving said entire forward lifting and control wing (5) and said support means (6,8,9,11) therefor with respect to the center of gravity of the aircraft in a direction parallel to the longitudinal axis of the aircraft.

2. Method according to claim 1 further comprising the step of
rotating the second lift force vector about an axis transverse to the longitudinal axis of the aircraft.

3. Method according to claim 1 further comprising the step of
rotating the second lift force vector about an axis parallel to the longitudinal axis of the aircraft.

4. Method according to claim 1, further comprising the step of moving the second lift force vector derived from the forward wing at a location remote from the longitudinal axis of the aircraft about an axis transverse to said longitudinal axis.

5. Aircraft control system to control a heavier-than-air, forward-control airfoil aircraft having a first lifting wing (4) to provide lift,
a forward lifting-and-control wing (5) located forwardly of the center of gravity (3) to provide a controlled lift vector;
said first lifting wing (4) being located behind the center of gravity (3) of the aircraft (1) and providing only part of the lift;
a support means (6,8,9,11) supporting said forward lifting-and-control wing (5) on the aircraft (1);
and means (7, 7'; 10, 10'; 12, 13) movably securing said support means (6,8,9,11) supporting said forward lifting and control wing (5) in the aircraft for movement of said entire forward lifting and control wing (5) and the support means (6,8,9,11) therefor in a direction parallel to the longitudinal axis of the aircraft to thereby move the entire forward lifting-and-control wing (5) and its support means (6,8,9,11) longitudinally with respect to the center of gravity (3) of the aircraft.

6. System according to claim 5 wherein said support means comprises an elongated, shaft-like member (11);
and said movable securing means comprises shaft support means for said shaft-like member (11), said shaft support means including a leading guide element (12) and a rear guide element (13), the rear guide element including a tubular member (15), guide tracks (14) located in the tubular member (15), the elongated shaft-like member (11) being longitudinally movable in the guide tracks.

7. System according to claim 6, including a control element (22) and interconnecting means (20, 18, 19, 21, 24) connecting the control element to longitudinally move said shaft-like member (11);

a tilt control means (25);
and connecting means (26, 26') connecting said tilt control means (25) with the said tubular member (15), to transfer movement from said tilt control means to rotate said tubular member (15) and hence said forward lifting-and-control wing about the longitudinal axis of the aircraft.

8. System according to claim 6, wherein the guide tracks (14) are inclined with respect to the shaft-like member (11) supporting the forward lifting and control wing (5) to provide for relative rotation of the forward lifting-and-control wing (5) with respect to an axis transverse to the longitudinal axis of the aircraft conjointly with longitudinal movement of said forward lifting-and-control wing.

9. System according to claim 6, wherein the tubular member (15) is rotatable about an axis parallel to the longitudinal axis of the aircraft.

10. System according to claim 5, wherein the forward lifting-and-control wing comprises wing portions (5a, 5b), one located on either side of said support means, said wing portions being relatively movable with respect to the aircraft and with respect to each other;
and control means (25) and interconnecting means (26) connecting said control means to said wing portions.

11. System according to claim 5, wherein the forward lifting-and-control wing (5c) is formed with movable flaps (50a, 50b);
and control means (25) and interconnecting means (26) connecting the control means to the movable flaps to move the flaps.

12. System according to claim 5 further comprising control means (22, 25) which are pilot-controllable connected to the support means (6, 8, 9, 11) to move the forward lifting-and-control wing (5), selectively and as controlled, longitudinally with respect to the aircraft and rotatably with respect to the first lifting wing (4).

13. System according to claim 12, wherein at least a portion of the forward lifting-and-control wing is movable about an axis transverse to the longitudinal axis of the aircraft.

14. System according to claim 12, wherein at least a portion of the forward lifting-and-control wing is movable about an axis parallel to the longitudinal axis of the aircraft.

15. System according to claim 5 wherein the securing means for said support means secure said support means, and hence said forward lifting-and-control wing for rotational movement with respect to the longitudinal axis of the aircraft.

16. System according to claim 15, including a control element (22) and connecting means (20, 18, 19, 21, 24) connecting the control element to move said support means (11) and hence said forward lifting-and-control wing (5) longitudinally of the aircraft;
and control means (25) and interconnecting means (26, 26'), connecting said control means (25) with said lifting-and-control wing (5) and transferring movement from said control means to rotate said lifting-and-control wing (5) also about an axis parallel to the longitudinal axis of the aircraft.

17. System according to claim 5, including a control element (22) and connecting means (20, 18, 19, 21, 24) connecting the control element to move said support means (11) and hence said forward lifting-and-control wing (5) longitudinally of the aircraft;

and control means (25) and interconnecting means (26) connecting said control means (25) with said lifting-and-control wing (5) and transferring movement from said control means (25) to rotate said lifting-and-control wing (5) also about the longitudinal axis of the aircraft.

18. System according to claim 5, including a control element (22) and connecting means (20, 18, 19, 21, 24) connecting the control element to move said entire support means (11) and hence said forward lifting-and-control wing (5) longitudinally of the aircraft;

and control means (25) and interconnecting means (26) connecting said control means (25) with said support means (11) and transferring movement from said control means to at least a portion (5, 5a, 5b; 50a, 50b) of the lifting-and-control wing to rotate at least said portion of the lifting-and-control wing about an axis transverse with respect to the longitudinal axis of the aircraft.

19. System according to claim 18, wherein said interconnecting means moves substantially the entire forward lifting-and-control wing about the axis transverse with respect to the longitudinal axis of the aircraft.

20. System according to claim 5, wherein said support means are movable to change the level of the forward lifting-and-control wing (5) with respect to the axis of the aircraft.

* * * * *